(12) United States Patent
Aoki

(10) Patent No.: US 6,453,236 B1
(45) Date of Patent: Sep. 17, 2002

(54) POSITION DISPLAY DEVICE

(75) Inventor: Nobuhiro Aoki, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/405,596

(22) Filed: Sep. 27, 1999

(30) Foreign Application Priority Data

Sep. 28, 1998 (JP) .......................................... 10-288690

(51) Int. Cl.[7] .......................... G01C 21/30; G01C 21/32
(52) U.S. Cl. ........................ 701/211; 701/206; 340/995
(58) Field of Search .............................. 701/200, 206, 701/211; 700/213, 211; 340/995

(56) References Cited

U.S. PATENT DOCUMENTS

| 5,543,802 A | * | 8/1996 | Villevieille et al. ......... 342/357 |
| 5,592,382 A | * | 1/1997 | Colley ........................ 364/449 |
| 6,115,669 A | * | 9/2000 | Watanabe et al. ........... 701/209 |
| 6,188,956 B1 | * | 2/2001 | Walters ....................... 701/200 |
| 6,195,609 B1 | * | 2/2001 | Pilley et al. ................. 701/120 |

* cited by examiner

*Primary Examiner*—Jeffery Brier
*Assistant Examiner*—Scott Wallace
(74) *Attorney, Agent, or Firm*—Frishauf, Holtz, Goodman & Chick, P.C.

(57) ABSTRACT

A position display device of this invention specifies a zone including at least two waypoints, and controls symbols expressing at least two waypoints and a symbol expressing a present invention of a movable object which moves to be displayed on a display screen of display means, based on waypoint information and the position of the movable object which are obtained by position obtaining means, such as a GPS, etc. The position obtaining means stores the position of the in advance a plurality of waypoints or a destination point which the movable object is estimated to pass and obtains position information representing the position of the movable object.

23 Claims, 10 Drawing Sheets

CONTOURS OF SPECIFIED RECTANGLE 41a

41b CONTOURS OF DISPLAY AREA

○ : PREVIOUS POSITION OF NAVIGATION APPARATUS
● : PRESENT POSITION OF NAVIGATION APPARATUS

START : POSITION OF DEPARTURE POINT
P1: POSITION OF FIRST WAYPOINT
P2: POSITION OF SECOND WAYPOINT

POSITION DISPLAY DEVICE

BACKGROUND OF THE INVENTION

1. Field of the Invention

The present invention relates to a technique for clearly displaying positions of a destination point and waypoints of a movable object, and a present position thereof.

2. Description of the Related Art

A technique for specifying a position of a movable object which moves, such as a person, etc., in order to display a position of the specified movable object and positions of the destination point and waypoint of the movable object, has been in widespread usage.

In such a technique, generally, not only measured latitude and longitude of the object, but also positions of the object, which are obtained by referring to the measured latitude and longitude, are displayed with the destination point and waypoint as needed on a map display. In a case where no destination point or no waypoint is displayed, in order to show a positional relationship between the destination point or waypoint and the movable object, values representing the direction and distance from the movable object to the destination point or waypoint are displayed.

In a case where there are a plurality of waypoints, the display contents have been when the movable object approaches a given distance away from one of the waypoints, and the direction and distance from the movable object to the approached waypoint has been newly displayed.

However, according to such a technique, the positions of the movable object can be displayed only with reference to the direction and distance from the object to just a certain waypoint. Thus, a positional relationship of three points (for example, the positional relationship of an already-passed waypoint, a to-be-passed waypoint and the position of the movable object) can not be accurately recognized.

In a case where the plurality of waypoints are set at short intervals, a target waypoint referred for displaying the positional relationship of the movable object and the waypoint is changed, when the movable object slightly moves. Therefore, it is difficult to recognize that the displayed direction and distance are meant to be the direction and distance from the movable object to which one of waypoints. This creates a problem that information is disorderly transmitted.

SUMMARY OF THE INVENTION

Accordingly, the present invention has been made in consideration of the above, an object thereof is to provide a position display device, a position display method and a storage medium for clearly displaying a positional relationship of at least three points among which the movable object moves.

According to one aspect of this invention, there is realized a position display device, which can continuously and clearly display a positional relationship of at least three points, comprising:

display means for displaying a positional relationship between a movable object which moves and a plurality of waypoints, which the movable object is estimated to pass;

waypoint storage means for storing waypoint information representing positions of the plurality of waypoints and order in which the movable object sequentially passes the waypoints;

movable-object-position obtaining means for obtaining position information representing a present position of the movable object;

zone specifying means for specifying a zone including at least two waypoints which the movable object is estimated to continuously pass, and for generating zone information representing the specified zone, based on the waypoint information stored in the waypoint storage means; and display controlling means for controlling a waypoint symbol expressing at least two waypoints included in a zone including the present position of the movable object and a present position symbol expressing the present position of the movable object to be displayed on a display screen of said display means, based on the zone information which the zone specifying means generates and information representing the present position of the movable object which the movable-object-position obtaining means obtains.

According to another aspect of this invention, there is realized a position display method for displaying a positional relationship between a movable object and a plurality of waypoints which the movable object is estimated to pass on a display screen of display means, and for continuously and clearly displaying a positional relationship of at least three points, comprising:

a waypoint storage step of storing waypoint information representing positions of the plurality of waypoints and order in which the movable object sequentially passes the plurality of waypoints;

a movable-object-position obtaining step obtaining position information representing a present position of the movable object;

a zone specifying step of specifying a zone including at least two waypoints which the movable object is estimated to continuously pass, and for generating zone information representing the specified zone, based on the waypoint information stored in the waypoint storage step; and a display controlling step of controlling a waypoint symbol expressing at least two waypoints included in a zone including the present position of the movable object and a present position symbol expressing the present position of the movable object to be displayed on a display screen, based on the zone information which is generated in the zone specifying step and information representing the present position of the movable object which is obtained in the movable-object-position obtaining step.

According to sill another aspect of the present invention, there is realized a computer readable storage medium which stores programs making a computer, which is connected to movable-object-position detecting means for detecting a position of a movable object which moves and position information representing the detected position, functions as:

waypoint storage means for obtaining and storing waypoint information representing positions of the plurality of waypoints and order in which the movable object sequentially passes the plurality of waypoints;

movable-object-position obtaining means for obtaining position information representing a present position of the movable object;

zone specifying means for specifying a zone including at least two waypoints which the movable object is estimated to continuously pass, and for generating zone information representing the specified zone, based on the waypoint information stored in the waypoint storage means; and display controlling means for controlling a waypoint symbol expressing at least two waypoints included in a zone including the present position of the movable object and a present position symbol expressing a present position of the movable object to be displayed on a display screen of said display means, based on the zone information which the zone specifying means generates and information representing the present position of the movable object which the movable-object-position obtaining means obtains.

According to further aspect of the present invention, there is realized a position display device, which can continuously and clearly display a positional relationship of at least three points, comprising:

display means for displaying a positional relationship between a position of a movable object which moves and a plurality of waypoints or a destination point which the movable object is estimated to pass;

waypoint storage means for storing waypoint information representing positions of the plurality of waypoints or destination point and order in which the movable object sequentially pass the plurality of waypoints or the destination point;

position obtaining means for obtaining position information representing a position of the movable object;

zone specifying means for specifying a zone including at least two waypoints which the movable object is estimated to pass, based on the waypoint information stored in the waypoint storage means and the position information representing a present position of the movable object which the position obtaining means obtains; and display controlling means for controlling symbols expressing at least two waypoints included in the zone including the present position of the movable object and a symbol expressing the present position of the movable object to be displayed on an identical display screen of the display means, based on the zone which the zone specifying means specifies.

According to still further aspect of the present invention, there is realized a position display device, which can continuously and clearly display a positional relationship of at least three points, comprising:

display means for displaying a positional relationship between a position of a movable object which moves and a plurality of waypoints or a destination point which the movable object is estimated to pass;

waypoint storage means for storing positions of the plurality of waypoints or destination point and waypoint information representing order in which the movable object sequentially passes the waypoints;

position obtaining means for obtaining position information representing the position of the movable object;

zone specifying means for specifying a zone including at least two waypoints, based on the waypoint information stored in the waypoint storage means; and display controlling means for controlling the position information of the movable object which is obtained by the position obtaining means, the zone specified by the zone specifying means, symbols expressing at least two waypoints and a symbol expressing a present position of the movable object to be displayed on a display screen of the display means.

According to yet still further aspect of the present invention, there is provided a position display device comprising:

a display unit having a display screen;

a memory;

an input device which includes user-operable portions and inputs waypoint information representing positions of the plurality of waypoints and order in which the movable object sequentially passes the plurality of waypoints;

a GPS device, including a receiver which receives signals from GPS satellites and obtains position information representing a position of the movable object based on the received signals;

a controller, which is connected to the display unit, the memory, the input device, and the GPS device, stores the waypoint information input by the input device into the memory, specifies a zone including at least two waypoints which the movable object is estimated to continuously pass, generates zone information representing the specified zone, based on the waypoint information stored in the memory, and controls the display unit to display a waypoint symbol expressing at least two waypoints included in a zone including the present position of the movable object and a present position symbol expressing the present position of the movable object, based on the zone information and information representing the present position of the movable object which the GPS device obtains.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENT

A navigation device which specifies a position of a movable object using a GPS (Global Positioning System) will now be explained as an exemplary device of a position displaying system and method according to an embodiment of the present invention.

Figure 1:
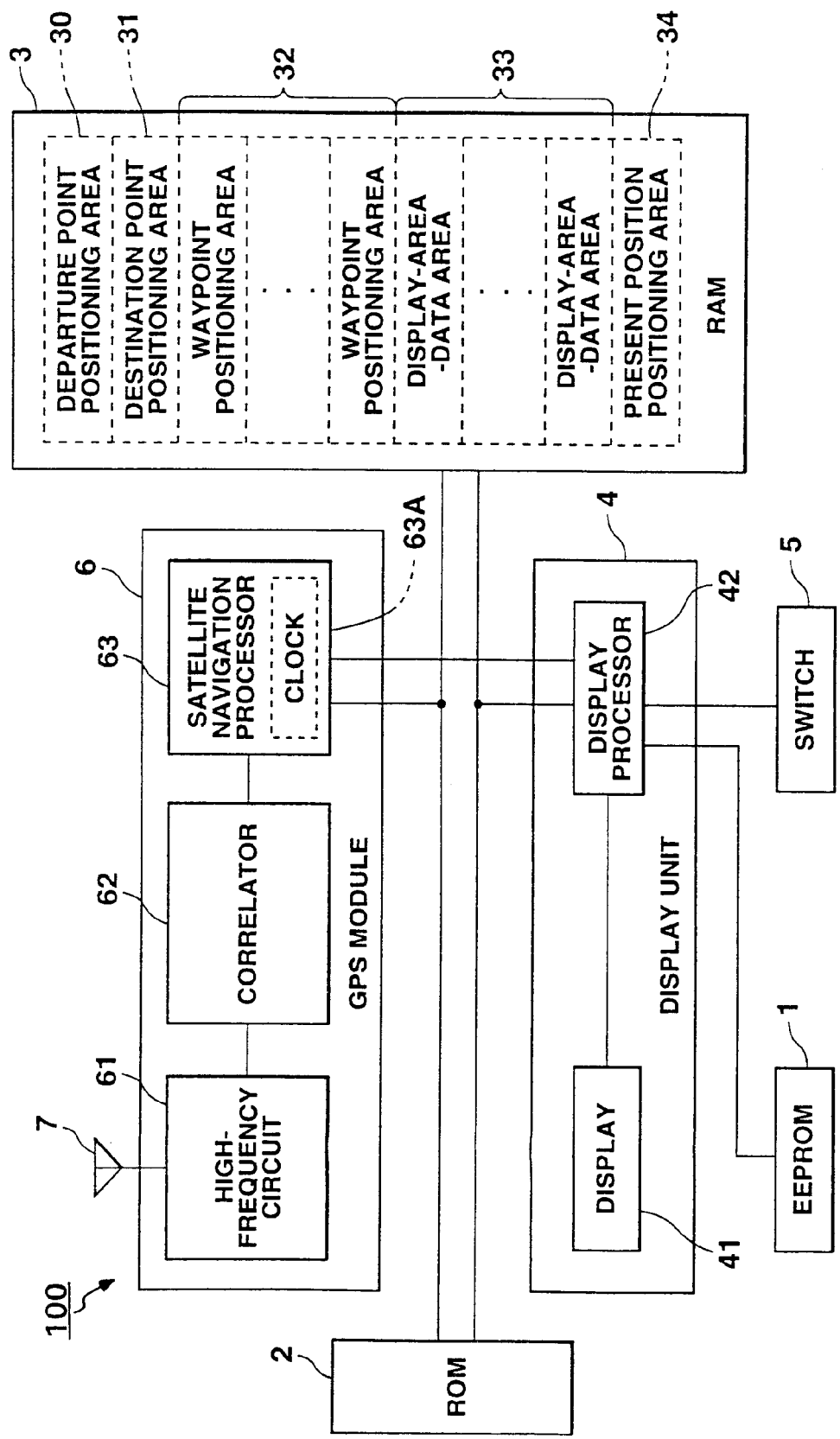
FIG. 1 is a block diagram showing the basic structure of a navigation device according to an embodiment of this present invention.

FIG. 1 is a block diagram showing the structure of the navigation device according to the embodiment of the present invention.

As shown in FIG. 1, a navigation device 100 is mounted in a portable wrist unit (for example, a wrist watch or the like) which a user may wear on his/her wrist, and comprises an EEPROM 1 (Electrically Erasable/Programmable Read Only Memory), a ROM 2 (Read Only Memory), a RAM 3 (Random Access Memory), a display unit 4, a switch 5, a GPS module 6 and a GPS antenna 7.

The EEPROM 1 stores map information regarding various symbols, characters, marks and the like, representing the distance, which the GPS module 6 generates, thereby the map information is output and displayed on the display unit 4 under the control of a display processor 42 included in the display unit 4, as will be explained later.

The ROM 2 stores program codes of a program carried out by the display processor 42 and program codes of a program executed by a satellite navigation processor 63 included in the GPS module 6, as will be explained later. In accordance with instructions from the display processor 42 and the satellite navigation processor 63, those program codes are output to the display processor 42 and the satellite navigation processor 63.

The RAM 3 stores measured position data which the satellite navigation processor 63 generates, and serves as a working area of the display processor 42 and the satellite navigation processor 63.

The RAM 3 includes storage areas, namely a departure position area 30, a destination point area 31, a waypoint location area 32, a display-area-data area 33 and a present position area 34, each of which stores data, as will be explained later.

Included in the display unit 4 are a display 41 and the display processor 42.

The display 41 is a LCD (Liquid Crystal Display) or a CRT (Cathode Ray Tube), and includes a display screen, wherein the ratio of the length relative to the width is at most three to four, thereby displaying characters and figures specified by the display processor 42 in accordance with the control of the display processor 42.

The display 41 displays such characters and figures, by displaying pixels which are arranged in a matrix form.

The display processor 42 includes a CPU (Central Processing Unit) or the like, and reads so as to carries out the programs stored in the ROM 2, for obtaining the measured position data which is stored in the RAM 3 by the satellite navigation processor 63 included in the GPS module 6. Based on the measured position data, the display processor 42 obtains the present position of the navigation device 100.

The display processor 42 prepares map information showing to-be-displayed target points (i.e., the departure point, the waypoint(s) and the destination point), from, through and to which the object moves with the aforementioned navigation device 100, so that the prepared map information is written in the EEPROM 1. When the map information is read from the EEPROM 1, the map represented by the read map information and the data representing a symbol with predetermined shape for expressing the present position of the object are supplied to the display 41, thereby the display 41 displays the image of the map information.

The switch 5 is a push switch or the like, and supplies data or instructions to the display processor 42 in accordance with the operations of the operator.

The GPS module 6 comprises a high-frequency circuit 61, a correlator 62 and the satellite navigation processor 63.

The high-frequency circuit 61 is tuned in to a satellite wave which is radiated from a GPS satellite and which is received by the GPS antenna 7, amplifies the satellite wave, and supplies the amplified wave to the correlator 62.

The correlator 62 supplies, to the satellite navigation processor 63, as a signal received from a satellite, a signal which is obtained when the satellite wave obtained by the high-frequency circuit 61 is demodulated, specifically reversely diffused. There are arranged a plurality of the correlators 62 which generate a plurality of satellite signals from a plurality of the demodulated satellite waves which are substantially in a simultaneous manner received from a plurality of GPS satellites.

The satellite navigation processor 63 includes a CPU and a clock 63A which supplies present time information regarding the present time.

The satellite navigation processor 63 receives the plurality of satellite signals which the correlators 62 supply and the present time information which the clock 63A supplies, in accordance with the program stored in the ROM 2. On the basis of arrival time differences in the satellite waves which are represented by the satellite signals and arrive at the GPS antenna 7, the satellite navigation processor 63 generates measured position data, including position information of the object (for example, a person who carries the navigation device 100, or a vehicle with the navigation device 100) moving. with the aforementioned navigation device 100 and information regarding the time the above-described position information is obtained, thereby to store the generated data in the RAM 3.

The GPS antenna 7 is a helical antenna, a dielectric antenna, a flat patch antenna or the like, and receives a satellite wave whose spectrum has been modulated, specifically diffused.

Operations of the navigation device 100 will now be explained with reference to FIGS. 2 to 9.

Process for Outputting Measured Position Data

Figure 2:
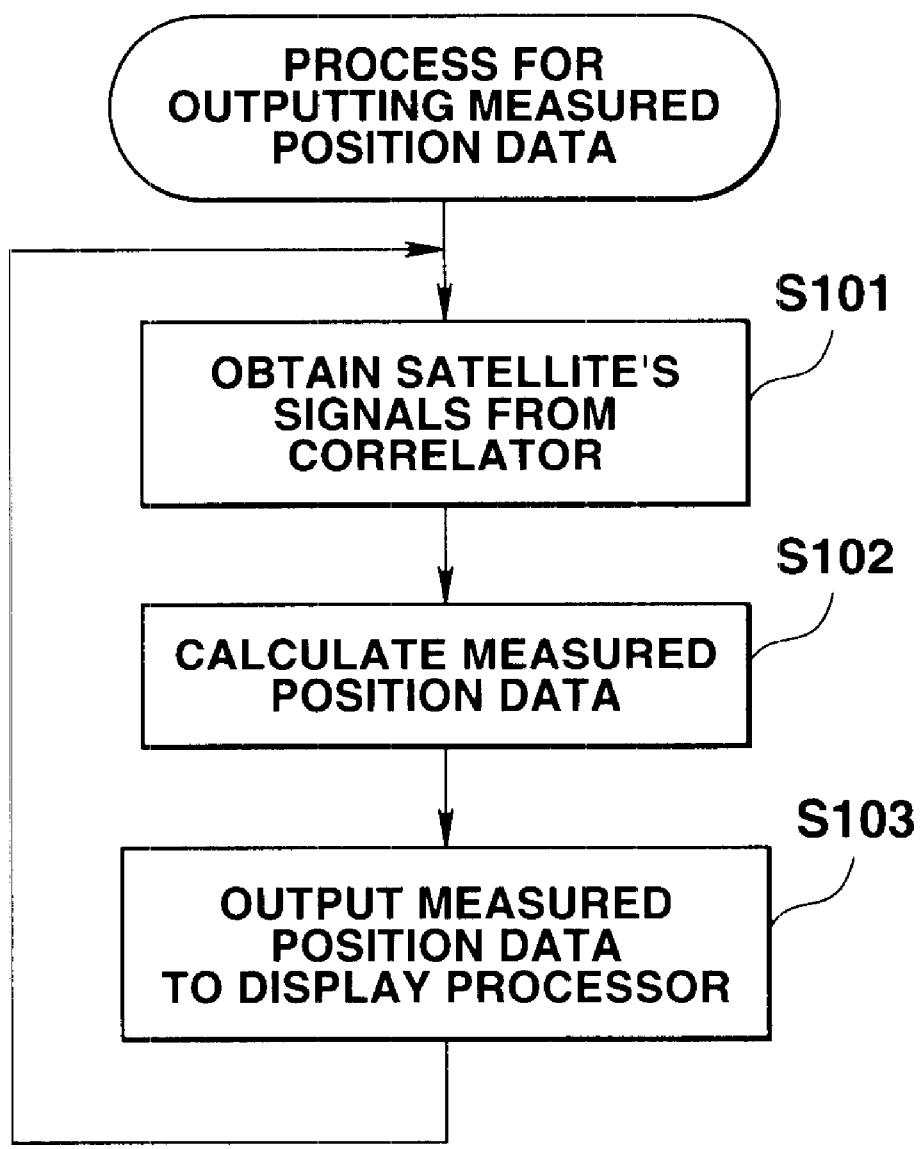
FIG. 2 is a flowchart illustrating a process for outputting measured position data.

The satellite navigation processor 63 executes a process for outputting measured position data, as shown in FIG. 2, when a power source is applied to the navigation device 100.

When the process is started, the satellite navigation processor 63 obtains, from the correlators 62, the satellite signals, wherein the satellite waves tuned and amplified by the high-frequency circuit 61. are demodulated, specifically reversely diffused, which have been received by the GPS antenna 7 (Step S101).

Next, the satellite navigation processor 63 generates orbit data representing an orbit of a satellite and virtual distance information (information regarding a distance between the navigation device 100 and the satellite), on the basis of the satellite signal obtained from the correlators. Moreover, the satellite navigation processor 63 calculates a to-be-measured position based on the orbit data of the satellite and the virtual distance information so as to obtain the measured position data regarding the latitude, longitude, altitude and speed of the object (Step S102).

When obtained the measured position data, the satellite navigation processor 63 updates measured position data stored in the present position area 34 included in the RAM 3 to the measured position data which has been obtained in Step S102, and outputs the updated measured position data to the display processor 42 (Step S103), and the flow returns to the process of Step S101. However, when the measured position data is firstly obtained in Step S201, the data is simply stored in the present position area 34 included in the RAM.

Process for Setting Passing Points

Figure 3:
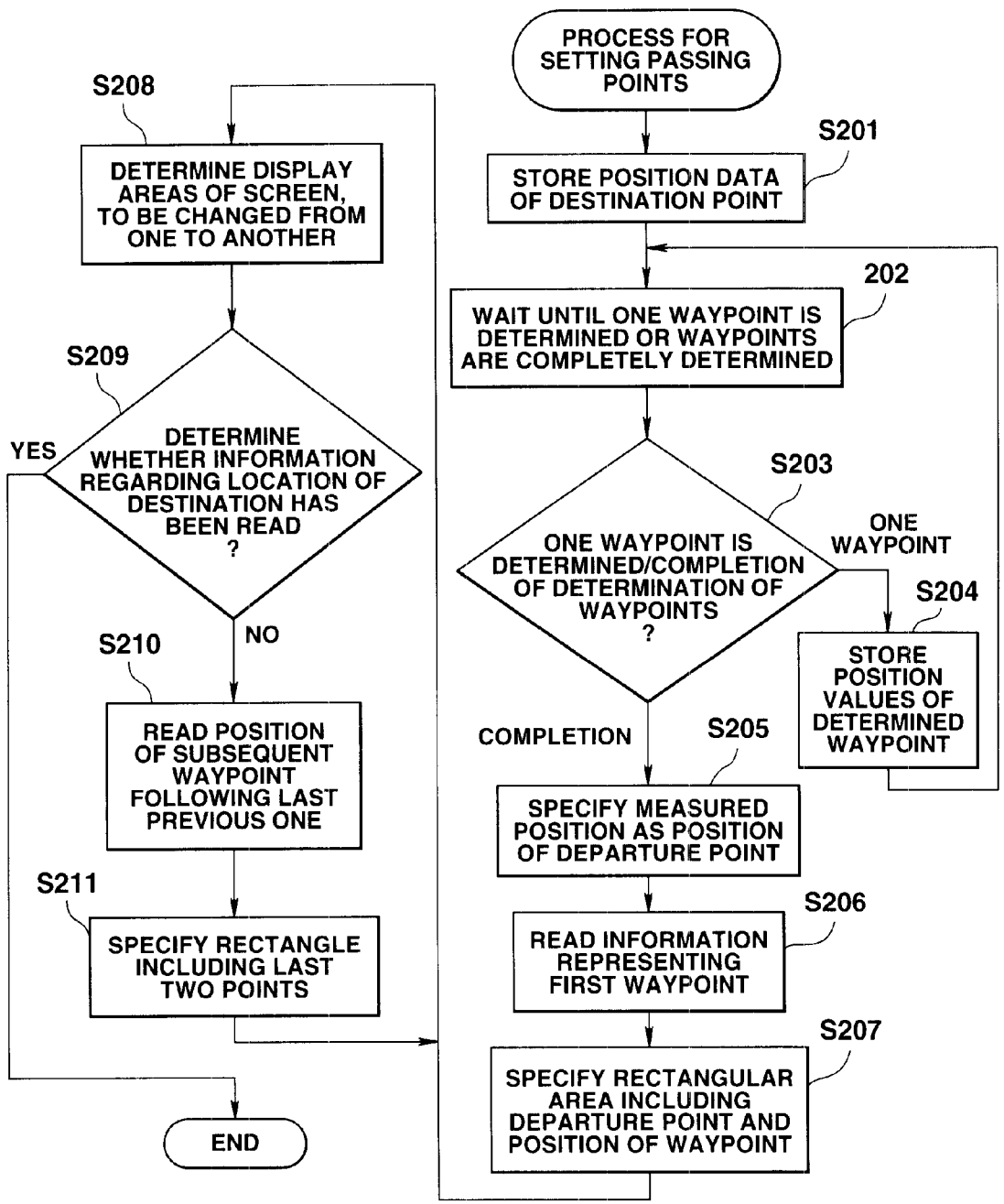
FIG. 3 is a flowchart illustrating a process for setting passing points.

The display processor 42 carries out a process for setting passing points, as shown in FIG. 3, when a power source is applied to the navigation device 100.

When the process is started, the display processor 42 controls the display 41 to display a message suggesting the operator to determine the destination, and waits for the operator, etc., operating the switch 5 to input his/her determination of the location of the destination point (i.e., in longitude and latitude).

The determination of the destination to travel is processed, for example, (1) when the operator inputs the latitude and longitude of the destination point by means of the switch 5, and
(2) when the operator stores in advance, in the ROM 2, information including the location of buildings, etc., in latitude and longitude, proposed for the destination, and numbers put on each building, and inputs the numbers addressed to the buildings proposed for the destination, by means of the switch 5.

Upon completion of determining the destination, the display processor 42 stores, in the destination point area 31 included in the RAM 3, the data of the location of the determined destination point in latitude and longitude as the data of the destination (Step S201).

Then, the display processor 42 controls the display 41 to display a message suggesting the operator to determine waypoints, which the movable object is estimated to pass in sequential order. Moreover, the display processor 42 waits for the operator, etc., operating the switch 5 to inform whether one of the waypoints is determined or whether the entire waypoints are completely determined (Step S202).

The determination of the waypoints is performed substantially in the same way as to determine the location of the destination point, for example, and the informing the completion of determining the waypoints is performed when the operator, etc., depresses a predetermined switch button included in the switch 5.

Upon operation of the switch 5, the display processor 42 determines whether one of the waypoint has been determined or whether the completion of the determination of the waypoints has been informed by the operator (Step S203).

In Step S203, when determined that the operator has determined one of the waypoints to go, the display processor 42 stores, in the waypoint position area 32 included in the RAM 3, the values of the positions of the determined waypoint in latitude and longitude, and the values (i.e., the order estimated to pass in sequential order) representing the order in which the waypoints are determined in a manner corresponding to each other, (Step S204), and returns the process to Step S202.

On the other hand, when determined that the operator has informed of the completion of determining the waypoints, the display processor 42 advances the process to Step S205.

In Step S205, the display processor 42 reads, of the measured position data currently stored in the RAM 3, the measured position data which has been obtained at the latest time as information regarding the position of the object. Further, the display processor 42 specifies the read measured position data as the present position of the object, that is, the position of the departure point, and stores the data in the departure position area 30 included in the RAM 3.

Next, the display processor 42 reads information representing the position of the waypoint, which has been firstly determined, from the waypoint position area 32 included in the RAM 3 (Step S206). However, in a case where the information representing the positions of the waypoints has already been read completely or where no waypoint is estimated, the display processor 42 reads information representing the location of the destination point.

Next, the display processor 42 specifies a rectangle having the minimum size that the rectangle can barely includes both the position (indicated in FIG. 4, with a reference numeral S) of the departure point and the location (indicated in FIG. 4, with reference numeral P1) of the destination point or the waypoint which has been firstly determined (Step S207).

Next, the display processor 42 determines a rectangle which can meet all of the following conditions (A) to (C).

Figure 4:
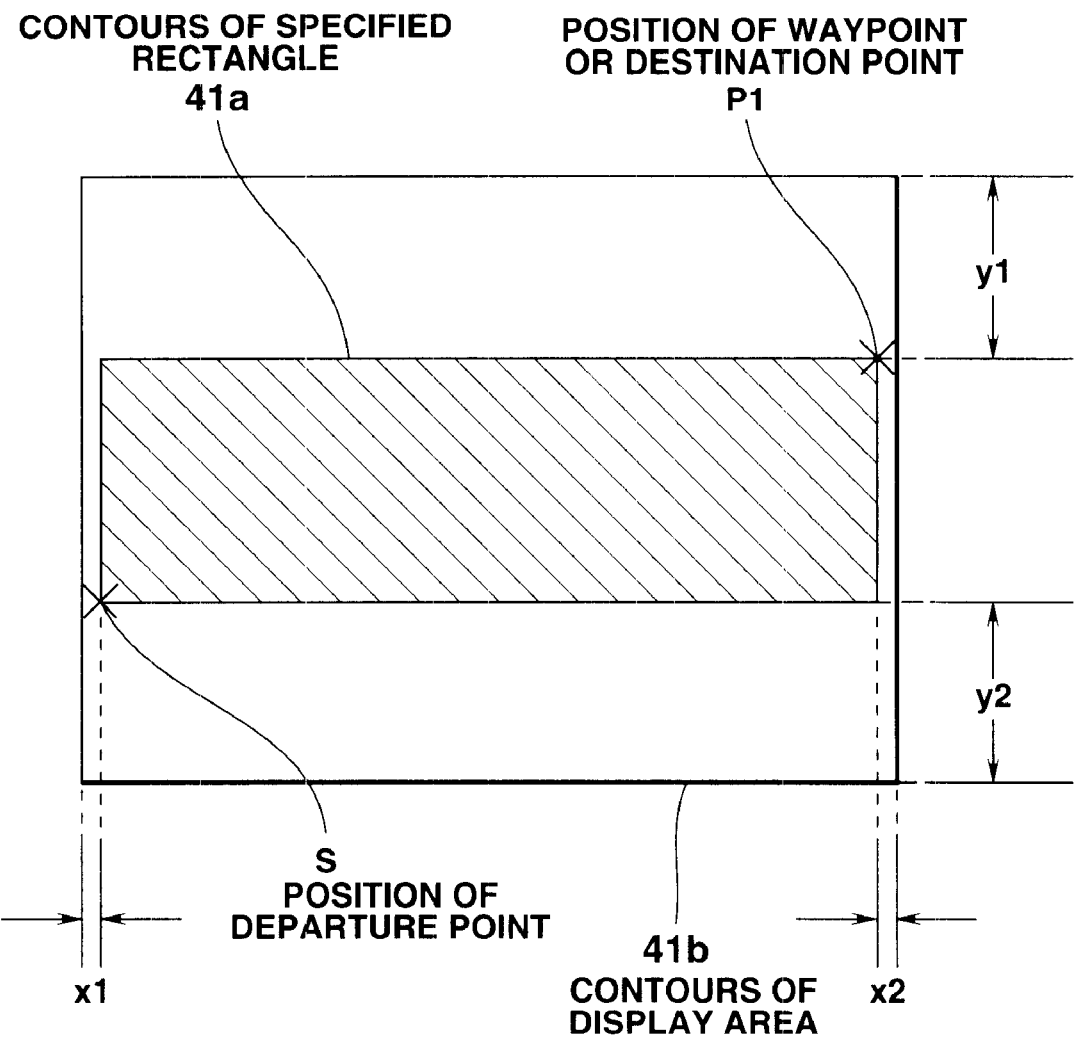
FIG. 4 is a diagram for explaining a criterion for determining a display area.

Specifically, as shown with an appended reference numeral 41b in FIG. 4, the to-be-determined rectangular area is to:

(A) have the contours which is substantially similar to that of the display screen of the display 41 (that is, the area has the contours in which the ratio of the length relative to the width is at approximately three to four);
(B) contain the rectangular area (the shaded portion shown in FIG. 4), which is specified in step S207 and which is positioned approximately in the center, with the contours 41a, (that is, for example, the contours 41 is positioned in such a way that portions each indicated as "x1" and "x2" are about in equal length, and likewise portions indicated as "y1" and "y2"); and
(C) have substantially the minimum size that the rectangle can barely meet the above-described two conditions (A) and (B).

Furthermore, the display processor 42 generates data representing the areas determined by itself as to meet all of the above-described conditions (A) to (C), and stores the generated data in the display-area-data area 33 included in the RAM 3 in a manner corresponding to the order in which the areas are sequentially determined (Step S208).

The areas determined in Step S208 are display areas which are changed over from one to another in accordance with the change of the present position of the navigation device 100, in a position display process, as will be explained.

The order added to the data representing such areas indicates, in the reverse order, the priority order in which each of the display areas is displayed in the position display process (in other words, the lower the added order, the lower the priority order).

Next, the display processor 42 determines whether the information regarding the location of the destination point has already been read (Step S209), and terminates the process for setting the waypoints when determined that the information had already been read.

In Step S209, when determined that the information regarding the location of the destination point has not been read yet, the display processor 42 reads out, from the waypoint position area 32 included in the RAM 3, information representing the position of the waypoint which is estimated to be passed subsequently (Step S210). On the other hand, when determined that the information regarding the location of the destination point has already been read, the display processor 42 reads out the information representing the location of the destination point.

Then the display processor 42 specifies a rectangle having the minimum size that the rectangle can barely includes last two points, of the destination and the waypoints included in the position information read in the process following Step S205 (Step S211), and returns the process to Step S208.

In the so-far-described process for setting passing points (that is, the procedure of steps S201 to S211), the departure point, the waypoints and the location of the destination point are registered, and the display areas which are changed over from one to another in accordance with the change of the present position of the object are determined.

Position Display Process

Figure 5:
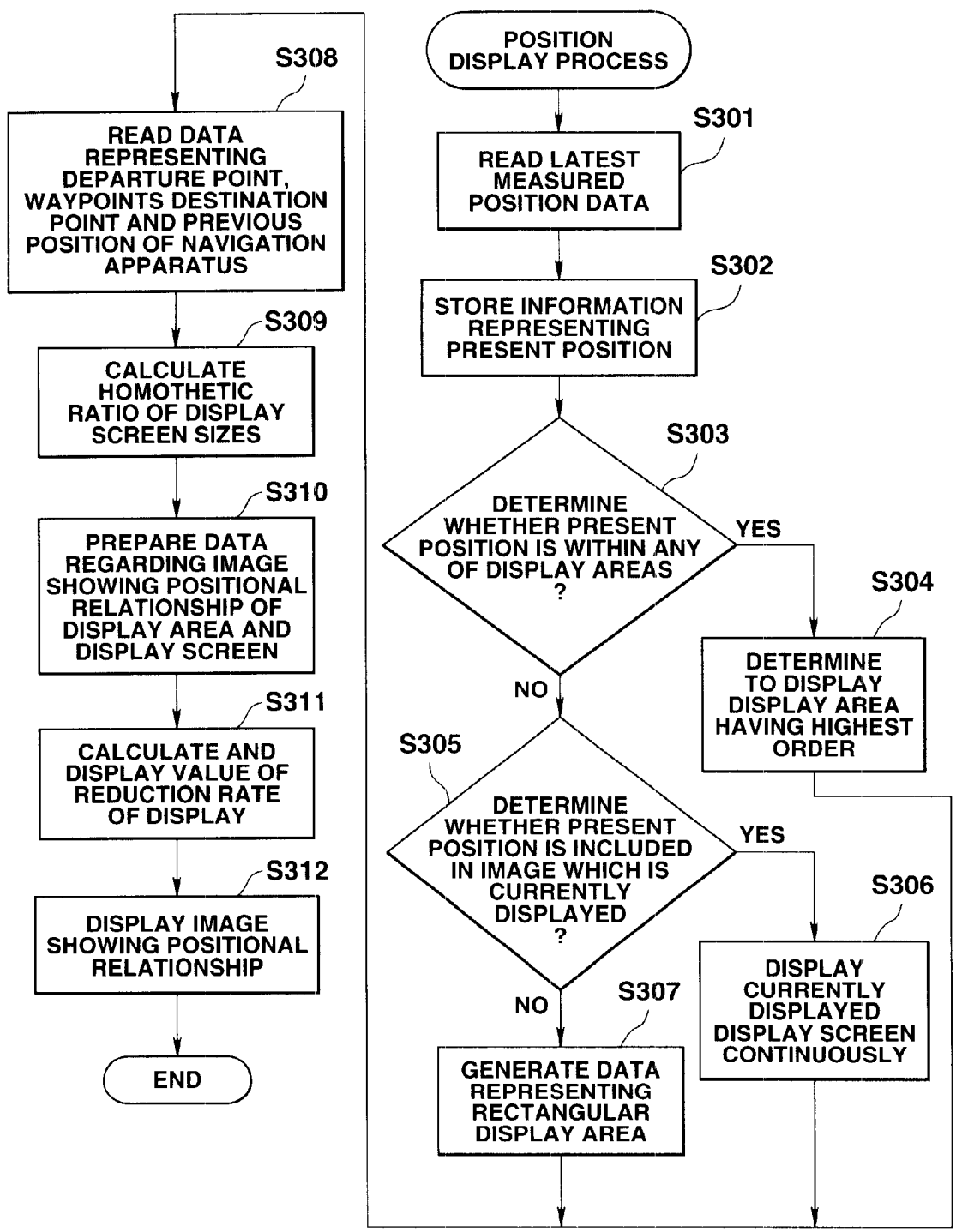
FIG. 5 is a flowchart illustrating a position display process.

When the process for setting passing points is completed, the display processor 42 carries out the position display process shown in FIG. 5, in response to an interruption signal, generated in a non-illustrative interruption occurrence section, for example, an interruption signal with constant frequency.

When the process is started, the display processor 42 reads out, of the measured position data stored in the RAM 3, the measured position data (Step S301).

Then, the display processor 42 stores, in the present position area 34 included in the RAM 3, the information representing the position of the navigation device 100 in latitude and longitude as information representing the present position thereof, of the read measured position data (Step S302). On the other hand, in a case where there has previously been stored the information representing the position in latitude and longitude stored in the present position area 34 included in the RAM 3 in Step S302, as the information representing the present position, such information is continuously retained in the present position area 34 as the information representing the previous position of the navigation device 100.

Next, the display processor 42 reads out the information representing the present position of the object and being stored in the present position area 34 in Step S302 and the data representing each of the display areas and being stored in the display-area-data area 33 included in the RAM 3 in the above-described process for setting waypoints. Furthermore, the display processor 42 determines whether the present position of the navigation device 100 is within any of the display areas (Step S303).

When determined that the present position of the object is within any of the display areas, the display processor 42 determines to display, of the display areas including the present position of the navigation device 100, the display area (i.e., the display area that the order is determined at the latest time) having the higher order than the order of the other area (Step S304), and advances the process to Step S308. On the other hand, when determined that the present position of the navigation device 100 is merely within a single display area, the display processor 42 determines to display the display area.

On the contrary, in Step S303, when determined that the present position of the navigation device 100 is not within any of the display areas, the display processor 42 determines whether the present position thereof is included in the image which is currently displayed on the display 41 (Step S305).

In a case where the display processor 42 determines that the present position is included therein, it determines to continuously display the image currently being displayed on the display 41 (Step S306), and advances the process to Step S308.

On the other hand, in Step S305, in an opposite case where the display processor 42 determines that the present position of the navigation device 100 is not included in the image currently displayed, it reads the information representing the area of the display area included in the currently-displayed screen and the information representing the departure point, the destination point and the positions of the waypoints, respectively from the display-area-data area 33, departure position area 30, destination point area 31 and waypoint position area 32 included in the RAM 3.

Then, the display processor 42 specifies a rectangle substantially having the minimum size that the rectangle can barely include the present position of the navigation device and, of the departure point, destination point and waypoints, the point(s) which is included in the display area of the currently-displayed screen.

Moreover, the display processor 42 determines, likewise the process in Step S208, to display a rectangular area (a) having the contours which is substantially similar to that of the display screen of the display 41, (b) including a specified area positioned approximately in the center and (c) having substantially the minimum size, on the display 41. The display processor 42 generates the data representing the area of the above-described rectangular area, stores the generated data in the display-area-data area 33 (Step S307), and advances the process to Step S308.

The display area which the display processor 42 has determined to display in Step S307 has the area size which is substantially equal to an enlarged scale of the previously-displayed display area, in order to include both the waypoints (including the departure point or the destination point within the area) within the previously displayed area and the present position of the navigation device 100.

Upon determination of the display area to be displayed on the display 41 as processed in Steps S304, 306 or 307, the display processor 42 reads, from the display-area-data area 33, the data representing the display area determined to be displayed and the data representing the departure point, waypoints, destination point and present position of the navigation device 100 (Step S308).

Based on the data representing the determined display area, the display processor 42 obtains a homothetic ratio (i.e., reduced scale) of the display screen sizes of the display 41 with respect to the size of the determined area, and stores the obtained value in the display-area-data area 33 (Step S309). The display processor 42 then prepares the data regarding an image, in which the determined display area has been reduced (or enlarged) in size so as to be equal to the display screen of the display area 41 in size (Step S310).

In the image which the data prepared in Step S310 represents, symbols expressing the departure point, waypoints, destination point, present position and previous position(s) of the navigation device 100 are respectively arranged in corresponding positions of the departure point, waypoints, destination point, present position and previous position(s) of the navigation device 100.

Specifically, for example, assume that the image represented by the data prepared in Step S310 represents an area including the departure point and the waypoint which the object firstly passes.

Figure 6A:
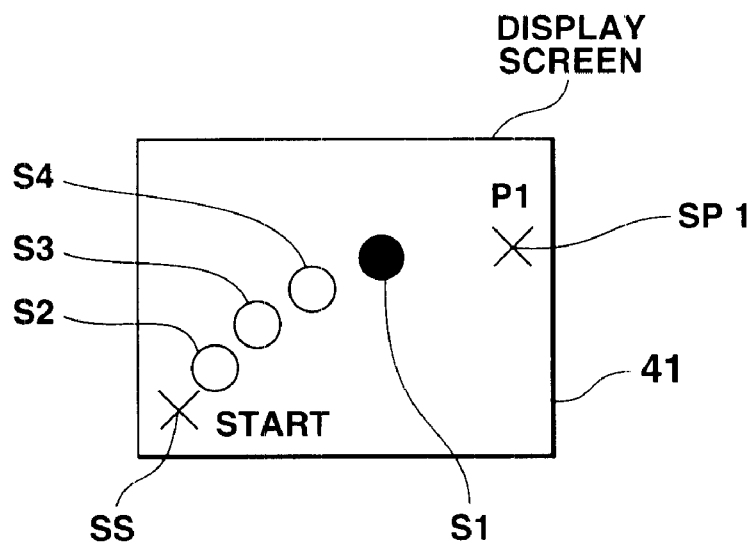
FIG. 6A is a diagram showing a screen displaying a present position, previous positions and waypoints of the navigation device according to the embodiment of this invention.
Figure 6B:
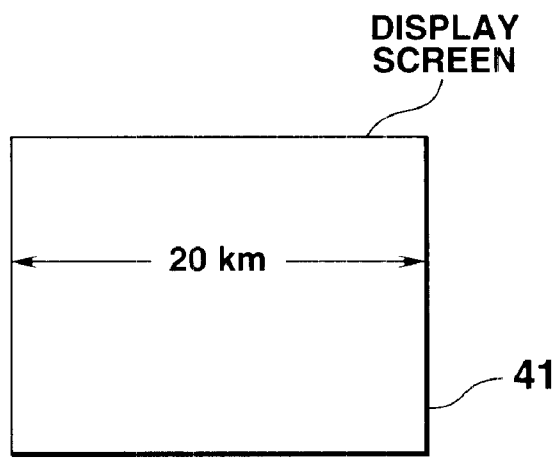
FIG. 6B is a diagram showing a screen for displaying a reduced scale of a display screen of the navigation device according to the embodiment of this invention.

In such a case, as shown in FIG. 6A, a symbol SS expressing the departure point, a symbol SP1 expressing the first waypoint, a symbol S1 expressing the present position of the navigation device 100 and symbols S2 to S4 expressing the previous positions thereof are arranged in a manner corresponding to the departure point, the first waypoint, the present and previous positions of the navigation device 100 in the image displayed on the display screen.

Based on the value of the reduced scale which has been obtained in Step S309, the display processor 42 calculates how long distance the long sides of the display screen of the display 41 correspond to the to-be-displayed area. Moreover, the display processor 42 controls the display 41 so as to display the image showing the calculated result on the display screen for a predetermined period (for example, about 2 seconds) (Step S311).

The image to be displayed in Step S311 includes a pair of arrows showing the length of the display screen and a number indicating how long distance the length of the long sides of the display screen corresponds to the currently-displayed area.

The display processor 42 controls the display 41 so as to display the image, (for example, the image shown in FIG. 6A) represented by the data prepared in Step S310, on the display 41 (Step S312).

Upon completion of displaying the image, the display processor 42 completes the position display process while sustaining the display of the image. If the aforementioned interruption signal is supplied again, the display processor 42 carries out the position display process again, beginning from Step S301.

In the procedure explained above, positions of two passing points (i.e., of the departure point, waypoints and the destination point, two waypoints which the navigation device 100 is estimated to continuously pass) which the navigation device 100 are estimated to continuously pass and the present position of the navigation device 100 are displayed on the display 41.

Such positions are displayed thereon in such a way that the distances among the symbols expressing the positions becomes maximum, and further, tracks (i.e., the previous positions) of the navigation device 100 are displayed as well.

Changes in the display contents which are displayed upon result of the above-described operations will now specifically be described.

Figure 7A:
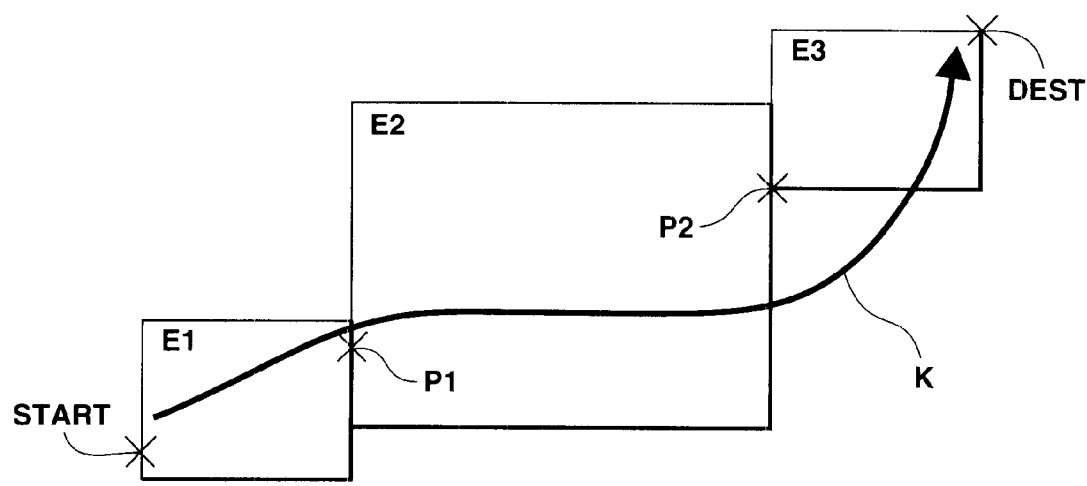
FIGS. 7A and 7B are diagrams for explaining changes in the screen contents of the navigation device according to the embodiment of this invention.

For example, as shown in FIG. 7A, when estimated to arrive at a destination point DEST, departing from a departure point START passing sequentially waypoints P1 and P2, assume that the navigation device 100 travels as the way indicated as a track K.

In this case, the display processor 42 determines in advance three areas E1 to E3 to be displayed, and stores the data representing the determined areas in the display-area-data area 33.

Figure 7B:
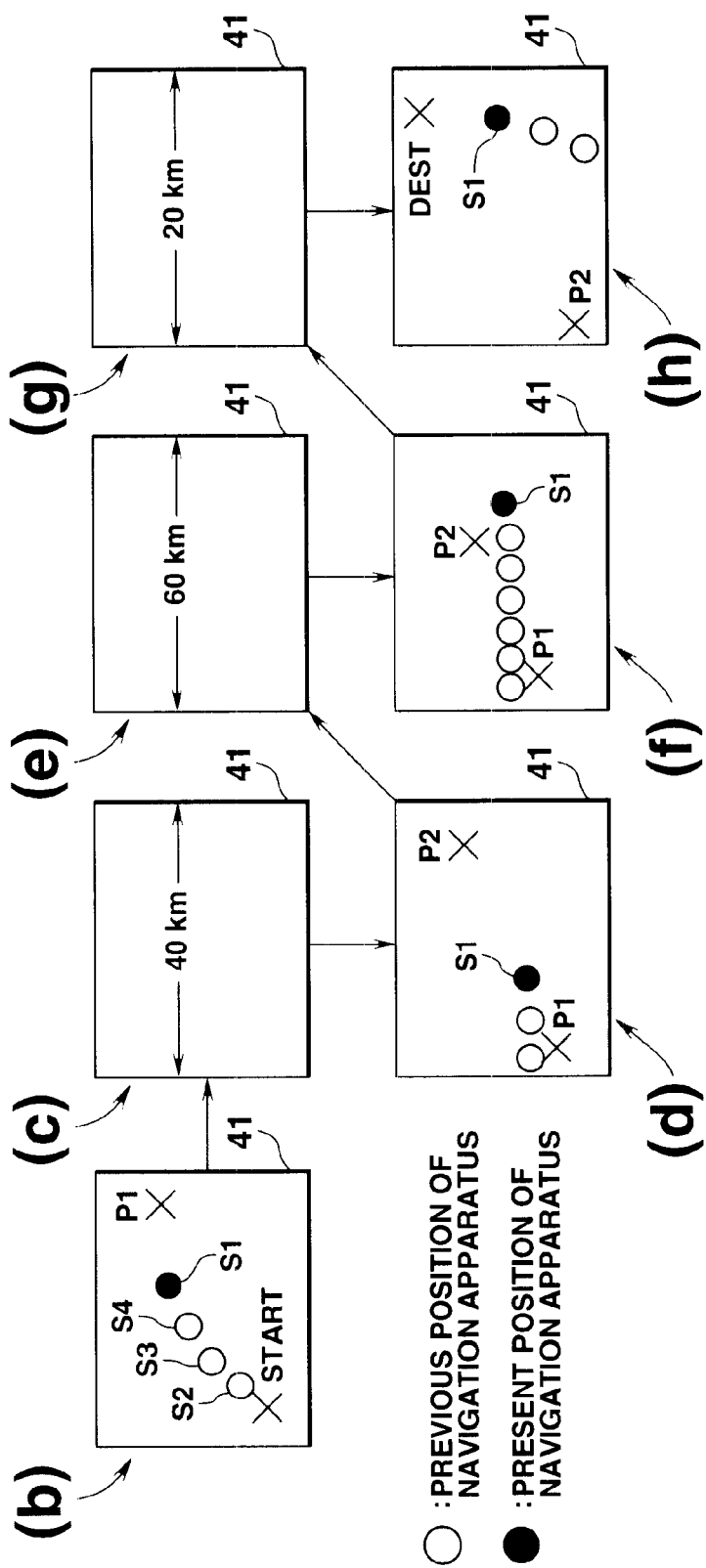

While the navigation device 100 moves within the area E1, the display 41 displays an image including the symbols (symbols "x" in a display screen (b) in FIG. 7B) expressing the departure point START and the waypoint P1, the symbol (black circle with the reference symbol S1) expressing the present position of the navigation device 100 and the symbol (white circle with the reference symbols S2 to S4) expressing the previous position of the navigation device 100.

As illustrated in FIG. 7A, when the navigation device 100 enters the area E2 from the area E1 through the boundaries of the areas E1 and E2, the display 41 displays, for two seconds, an image showing the reduced scale of the image to be displayed thereafter, as shown in a display screen (c) in FIG. 7B. Subsequently, the display 41 displays an image including the symbols (symbols "x" in a display screen (d) in FIG. 7B) expressing the two waypoints P1 and P2 and the symbol S1 expressing the present position of the navigation device 100, as shown in a display screen (d) in FIG. 7B.

Next, when the navigation device 100 is positioned outside the area E2 and does not enter any of the areas E1 to E3, the display 41 displays, for two seconds, an image showing the reduced scale of the image to be displayed thereafter as shown in the display screen (d) in FIG. 7B. Then, the display 41 displays an image (i.e., the image shown in a display screen (f) in FIG. 7B), wherein the image shown in the display screen (d) in FIG. 7B has been reduced in size so as the symbol S1 expressing the present position of the navigation device 100 to be included in the display screen.

When the navigation. device 100 enters the area E3, the display 41 displays, for two seconds, the image showing the reduced scale of the image to be displayed thereafter shown in a display screen (g) in FIG. 7B, and displays an image, shown in FIG. (h), including the symbols expressing the waypoint P2 and destination point DEST and the symbol S1 showing the present position of the navigation device 100.

The navigation device 100 is not limited to that described above.

For example, a single CPU may function as the display processor 42 and the satellite navigation processor 63, whereas a single EEPROM may function as the EEPROM 1 and the ROM 2.

The display unit 4 may display the information showing the reduced scale of the display screen, in accordance with an arbitrary procedure and style not limited to the above-described procedure, in which the number showing how long distance the lengths of the long sides of the display screen correspond to the area is displayed in Step S311.

In addition to the above, in a case where the reduced scale calculated in Step S309 is substantially equal to that of the image currently displayed as a result of the process of Step S312, the display unit 4 may shift the process to Step S312 without displaying the information representing the reduced scale of the display screen.

The target object that the navigation device 100 displays for indicating the position thereof need not be the navigation device 100b itself, but may be an arbitrary object.

The criterion by which the area displayed by the display 41 is determined is not limited to the above, instead, an arbitrary criterion may be employed for determining a to-be-displayed area so that any of desired positions of departure point, waypoint(s) and destination point, and the present position of the navigation device 100 is displayed in a single display screen.

Figure 8A:
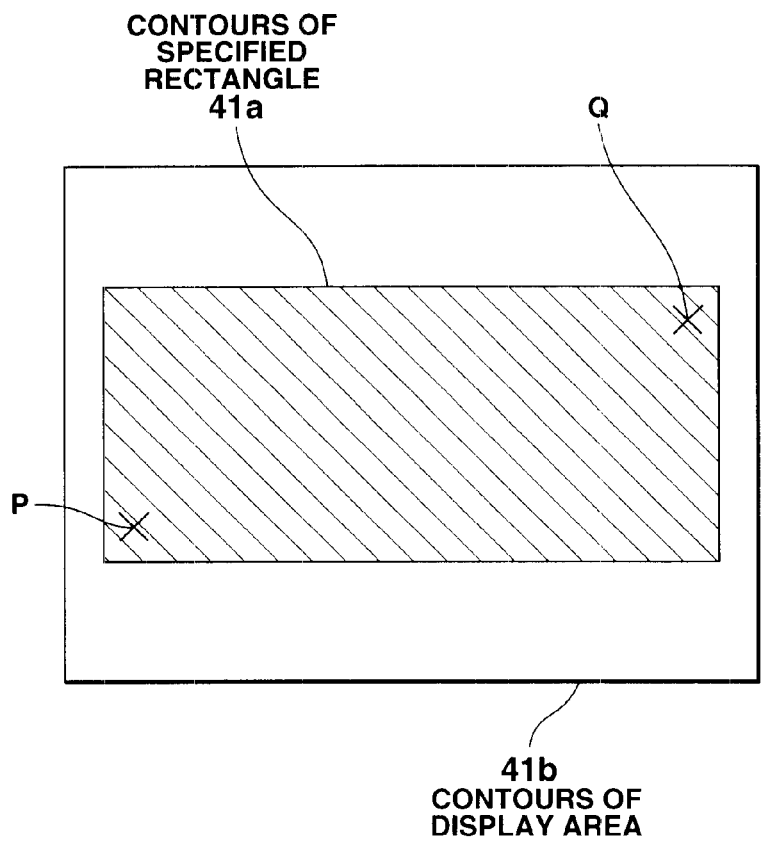
FIG. 8A is a diagram for explaining a criterion for determining a display area.

Particularly, for example, the display processor 42 may determine to display, on the display 41, the area which meets the following conditions (D) to (G), after specifying a rectangle 41a, having the minimum size that the rectangle can barely include positions of the to-be-displayed departure point, waypoint(s) and destination point and the present position of the navigation device 100, as processed in Steps S208 and S307 and as shown in FIG. 8A.

That is, the display processor 42 may determine to display, on the display 41, the rectangle area:

(D) having the contours substantially identical with the contours of the display screen of the display 41;

(E) being positioned so as the specified rectangle 41 a positioned therein to be approximately in the center;

(F) wherein the positions (for example, in FIG. 8A, the positions indicated with symbols with reference marks P and Q) of the departure point, waypoints, destination point and the present position of the navigation device 100 are displayed respectively in positions for maintaining a predetermined space from the edge of an image, when assuming the area which has been reduced (or enlarged) by the size of the display screen;

(G) having substantially the minimum size that the rectangle area can barely meet the above-described two conditions (D) and (F).

Figure 8B:
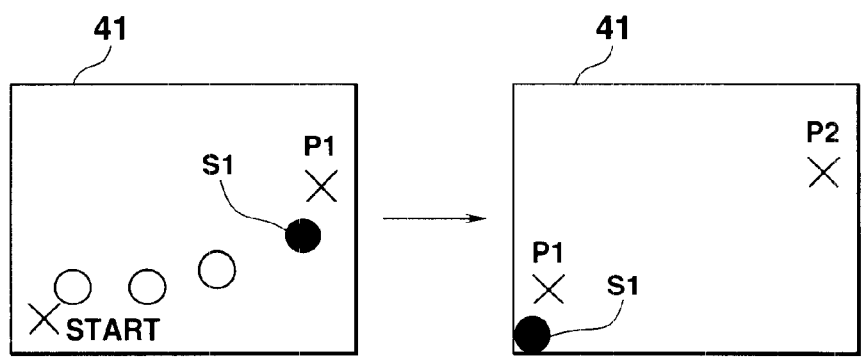
FIG. 8B is a diagram for explaining changes in the screen contents of the navigation device according to the embodiment of the present invention.

Specifically, the rectangular area which can meet the above-described conditions (D) to (F) becomes one shown with the reference mark 41*b* in FIG. 8B.

By setting a to-be-displayed area in accordance with the above-described conditions, when the navigation device 100 is just approaching a waypoint ahead thereof, it displays the position of the waypoint and the position of the subsequent waypoint (or the destination point) together with the symbol S1 expressing its present position, certainly before the navigation device 100 passes the waypoint ahead, as shown in FIG. 8B.

Therefore, a person who carries the navigation device 100 can accurately be aware of the positional relationship of the waypoint, which the navigation device 100 is approaching, the subsequent waypoint (or destination point) to be approached thereafter and its present position.

In the above-described condition (F), the predetermined space which should be kept between the edge of the image and each position of the departure point, waypoints, destination point and the present position of the navigation device 100 in the image may be one pixel, in a case where, for example, the display 41 is to display a screen image composed of pixels arranged in a matrix form.

The above-described space may be set in length long enough to continuously display all the symbols expressing the positions of the departure point, waypoints and destination point, and the present and previous positions of the navigation device 100.

Figure 9A:
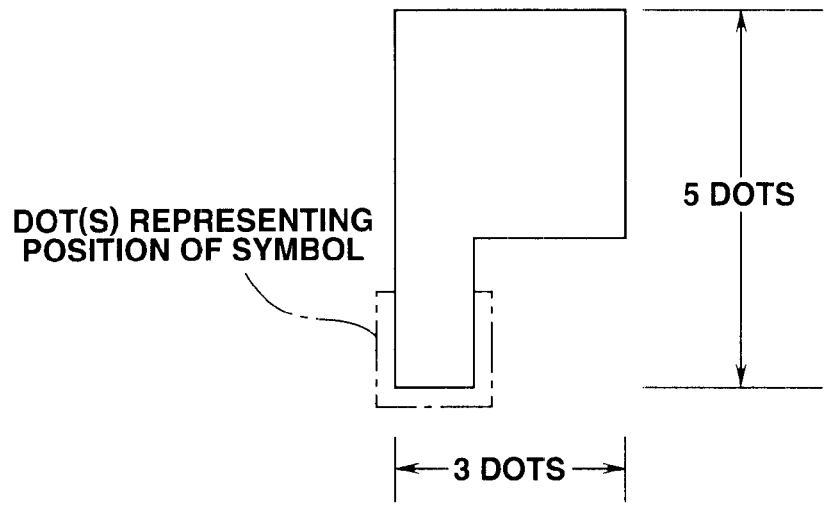
FIG. 9A is a diagram showing a shape of a symbol representing a passing point.
Figure 9B:
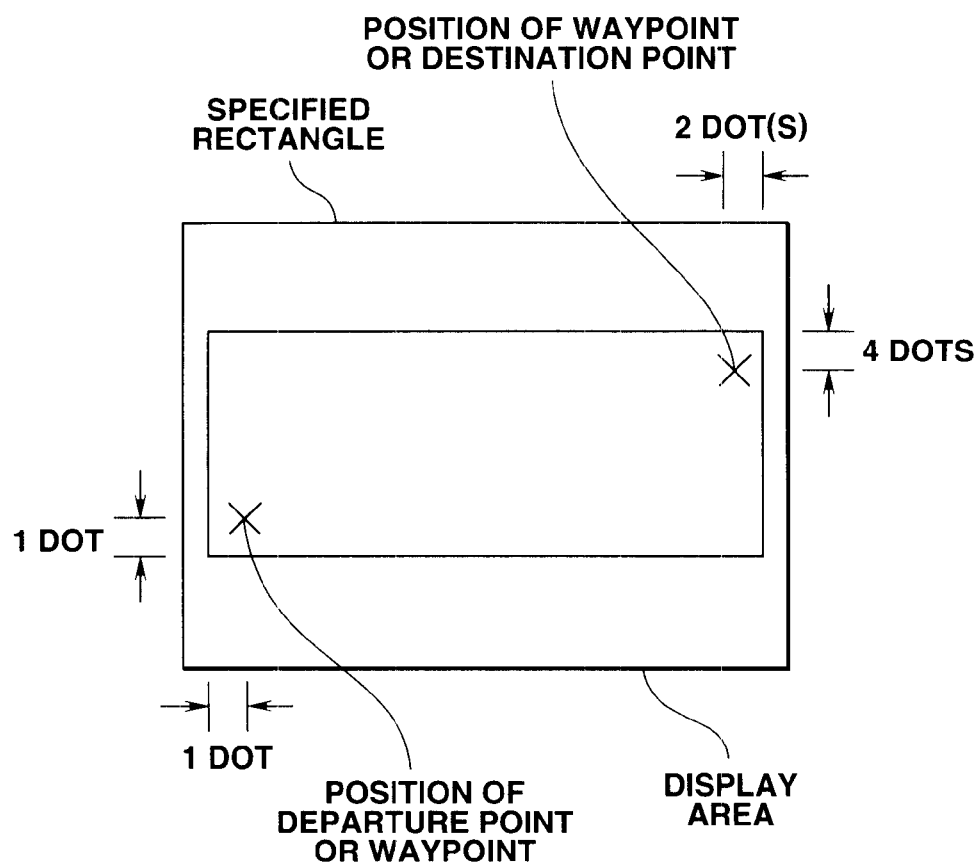
FIG. 9B is a diagram for explaining a criterion for determining a display area.

For example, in a case where the symbols expressing the departure point, waypoints and destination point have the form with the length of 5 dots and the width of 3 dots, having the shape shown in FIG. 9A, wherein the lower left dot thereof represents the position of each symbol (i.e., the data represents the position of the departure point, waypoints or destination point with the most accuracy), the above-described predetermined space can be set as shown in FIG. 9B.

Specifically, in order to completely display the form shown in FIG. 9A, the above-described predetermined space can be set in the display screen, while maintaining a space with four dots from the upper edge, one dot from the lower and left edges and two dots from the right edge of the screen.

The form of the display screen of the display 41 is not limited to the above and is arbitrarily determined. For example, the ratio of the length relative to the width of the display screen need not approximately be at three to four, and the display area need not substantially be in the rectangular form.

In response to instructions transmitted from the operator operating the switch 5, the display unit 4 may display an image showing the symbols expressing the positions of the departure point, destination point and the entire waypoints and the symbol expressing the present position of the navigation device 100.

In the aforementioned image, after specifying an area substantially having the minimum size that the area can include the present position of the navigation device 100 and the positions of the entire waypoints, departure point and destination point, the area may be so reduced (or enlarged) in its size as to match with the size of the display screen of the display 41. Then, the symbols expressing the present position of the navigation device 100 and the positions of the entire waypoints, departure point and destination point are displayed substantially in the maximum intervals therebetween on the display screen.

In response to instructions sent from the operator operating the switch 5, the display unit 4 may display an image including an area wherein the present position of the navigation device 100 is not included, of the areas determined in Step S208.

For example, as shown in FIG. 7A, while the navigation device 100 is positioned in the area E1 in a case where it is estimated to get the destination point DEST sequentially from the destination point START through the waypoints P1 and P2, the navigation device 100 may display symbols expressing the positions of the waypoint and destination point included in the area E2 and E3, in response to the instructions from the operator.

The navigation device 100 need not prepare itself a map showing the target field where the device 100 is to travel, and may comprise a storage medium which in advance records data representing the map showing the target field where it is to travel. The display processor 42 may read data representing the map which the navigation device 100 stores in advance, and extract data representing a target area to be displayed on the display 41.

The navigation device 100 may specify its position itself using an arbitrary system other than the GPS. When the navigation device 100 is mounted in a vehicle, it may specify, for example, its own position based on revolutions per minute of the wheel which the vehicle equips.

In such a case, the navigation device 100 includes, for example, a position inference module, comprising a car-speed sensor, an angle sensor, a back-light sensor and an inference navigation processor.

The car-speed sensor supplies, to the inference navigation processor, a pulse signal (for example, a pulse signal whose frequency is proportional to the revolutions per minute of the wheel) showing the revolutions per minute of the wheel included in the vehicle in which the navigation device 100 is mounted.

The angle sensor comprises a gyrocompass, etc., measures a relative angle between an ahead direction in which the vehicle moves and a reference direction which the gyrocompass indicates, and supplies information regarding the measured relative angle to the inference navigation processor.

The inference navigation processor includes a CPU, or the like, and obtains a pulse signal from the car-speed sensor, a relative angle signal from the angle sensor and a behind signal from the back-light sensor. Then, the inference navigation processor analyzes such an obtained signal or information representing previous position(s) of the vehicle, generates information representing the present position thereof, and stores the generated information in RAM 3.

As explained above, the position display device is not limited to a dedicated system, and can be realized using an ordinary computer system. For example, the position display device which execute the above-described processes, can be realized installing programs for carrying out the above-described processes into computers, which are connected to a device supplying the information representing its own position, such as a module for specifying its position using the GPS, the car-speed sensor, the angle sensor, from any medium (a floppy disk, a CD-ROM, etc.) which stores the programs.

The medium for supplying the programs to computers may be a communications medium (a medium which temporarily in a fluid manner retains the programs, like a communications line, a communication network and a communication system). For example, the programs may be presented on the bulletin board of the communications network and may be supplied to the computers via the network.

Then, the above programs are activated and executed under the control of the OS so as to carry out the above-described processes, as well as other application programs.

When a part the processes is assigned to the OS or the OS partially comprises one composing element of the present invention, the storage medium may store the programs without including the part. In this case, according to the present invention, the programs for carrying out functions and steps executed by the computers are to be stored in the storage medium.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. H10-288690 filed on Sep. 28, 1998 and including specification, claims, drawings and summary. The disclosure of the above Japanese Patent Application is incorporated herein by reference in its entirety.

What is claimed is:

1. A position display device comprising:

display means for displaying a positional relationship between a movable object which moves and a plurality of waypoints which the movable object is estimated to pass;

waypoint storage means for storing waypoint information representing positions of the plurality of waypoints and an order in which the movable object sequentially passes the plurality of waypoints;

movable-object-position obtaining means for obtaining position information representing a present position of the movable object;

zone specifying means for specifying a zone including at least two waypoints which the movable object is estimated to continuously pass, and for generating zone information representing the specified zone, based on the waypoint information stored in said waypoint storage means; and display controlling means for controlling a waypoint symbol expressing at least two waypoints included in a zone including the present position of the movable object and a present position symbol expressing at least a present position of the movable object to be displayed on a display screen of said display means, based on the zone information which said zone specifying means generates and information representing the present position of the movable object which said movable-object-position obtaining means obtains, wherein the zone information generated by said zone specifying means includes data representing a plurality of dots which are arranged so as to form a matrix showing the zone specified by said zone specifying means, the zone being a zone including two waypoints which the movable object is estimated to continuously pass and being specified as dots showing the two waypoints not to be positioned at the outside limit of the matrix.

2. The position display device according to claim 1, wherein the zone which the zone information generated by said zone specifying means represents is a zone including two waypoints which the movable object is estimated to continuously pass, and including the two waypoints in positions for maintaining a predetermined distance away from edges of the zone.

3. The position display device according to claim 1, wherein said display controlling means includes display-screen changeover controlling means for determining whether a zone including the present position of the movable object is displayed on the display screen, and for controlling a present-position symbol and a subsequent-waypoint symbol to be displayed on the display screen, in place of the present position symbol and the waypoint symbol both of which have been displayed when a determination is made that the zone is not on the display screen.

4. The position display device according to claim 1, wherein said display controlling means includes reduced scale controlling means for controlling the symbols to be displayed in a scale in which a distance between the present position and waypoint symbols substantially becomes a maximum on the display screen.

5. The position display device according to claim 4, wherein said reduced scale controlling means includes symbol arrangement controlling means for controlling the symbols to be displayed, so as a rectangle having a minimum sized-area including the present position and waypoint symbols in the display screen to be substantially arranged at a center of the display screen.

6. The position display device according to claim 1, wherein said display controlling means includes previous position displaying means for controlling a previous position symbol expressing a previous position of the movable object to be displayed on the display screen, based on position information which is obtained by said movable-object-position obtaining means.

7. The position display device according to claim 1, wherein said display controlling means includes reduced scale information display controlling means for controlling information, which represents a reduced scale of a zone including positions expressed by the waypoint and present position symbols.

8. The position display device according to claim 1, wherein said zone specifying means includes means for specifying a zone including all waypoints.

9. The position display device according to claim 1, wherein said movable-object-position obtaining means comprises:

satellite wave receiving means for receiving waves which a plurality of satellites emit approximately at a same time, and position measuring means for specifying a position of the movable object based on arrival time differences between a plurality of the waves which said satellite wave receiving means receives, and generating the position information representing the specified position.

10. The position display device according to claim 1, wherein said controller determines whether a zone including the present position of the movable object is displayed on the display screen, and controls said display unit to display a present-position symbol and a subsequent-waypoint symbol, in place of the present position symbol and the waypoint symbol both of which have been displayed when a determination is made that the zone is not on the display screen.

11. A position display method for controlling a positional relationship between a movable object which moves and a plurality of waypoints which the movable object is estimated to pass to be displayed on a display screen of display means, said method comprising:

a waypoint storage step of storing waypoint information representing positions of the plurality of waypoints and an order in which the movable object sequentially passes the plurality of waypoints;

a movable-object-position obtaining step of obtaining position information representing a present position of the movable object;

a zone specifying step of specifying a zone including at least two waypoints which the movable object is estimated to continuously pass, and of generating zone information representing the specified zone, based on the waypoint information stored in said waypoint storage step; and a display controlling step of controlling a waypoint symbol expressing at least two waypoints included in a zone including the present position of the movable object and a present position symbol expressing the present position of the movable object to be displayed on a display screen, based on the zone information which is generated in said zone specifying step and information representing the present position of the movable object which is obtained in said movable-object-position obtaining step, wherein the zone information generated by said zone specifying step includes data representing a plurality of dots which are arranged so as to form a matrix showing the zone specified by said zone specifying step, the zone being a zone including two waypoints which the movable object is estimated to continuously pass and being specified as dots showing the two waypoints not to be positioned at the outside limit of the matrix.

12. A computer readable storage medium which stores programs making a computer, which is connected to movable-object-position detecting means for detecting a position of a movable object which moves and position information representing the detected position, function as:

waypoint storage means for obtaining and storing waypoint information representing positions of the plurality of waypoints and an order in which the movable object sequentially passes the plurality of waypoints;

movable-object-position obtaining means for obtaining position information representing a present position of the movable object;

zone specifying means for specifying a zone including at least two waypoints which the movable object is estimated to continuously pass, and for generating zone information representing the specified zone, based on the waypoint information stored in said waypoint storage means; and display controlling means for controlling a waypoint symbol expressing at least two waypoints included in a zone including the present position of the movable object and a present position symbol expressing the present position of the movable object to be displayed on a display screen of said display means, based on the zone information which said zone specifying means generates and information representing the present position of the movable object which said movable-object-position obtaining means obtains, wherein the zone information generated by said zone specifying means includes data representing a plurality of dots which are arranged so as to form a matrix showing the zone specified by said zone specifying means, the zone being a zone including two waypoints which the movable object is estimated to continuously pass and being specified as dots showing the two waypoints not be be positioned at the outside limit of the matrix.

13. A position display device comprising:

display means for displaying a positional relationship between a position of a movable object which moves and a plurality of waypoints or a destination point which the movable object is estimated to pass;

waypoint storage means for storing waypoint information representing positions of the plurality of waypoints or destination points and an order in which the movable object sequentially passes the plurality of waypoints or the destination point;

position obtaining means for obtaining position information representing a position of the movable object;

zone specifying means for specifying a zone including at least two waypoints which the movable object is estimated to pass, based on the waypoint information stored in said waypoint storage means and the position information representing a present position of the movable object which said position obtaining means obtains, and for generating data representing a plurality of dots which are arranged to form a matrix showing the specified zone, the specified zone including two waypoints which the movable object is estimated to continuously pass and being specified as dots showing the two waypoints not to be positioned at the outside limit of the matrix; and display controlling means for controlling symbols expressing at least two waypoints included in the zone including the present position of the movable object and a symbol expressing the present position of the movable object to be displayed on an identical display screen of said display means, based on the zone which said zone specifying means specifies.

14. A position display device comprising:

display means for displaying a positional relationship between a position of a movable object which moves and a plurality of waypoints or a destination point which the movable object is estimated to pass;

waypoint storage means for storing positions of the plurality of waypoints or destination point and waypoint information representing an order in which the movable object sequentially passes the waypoints;

position obtaining means for obtaining position information representing a position of the movable object;

zone specifying means for specifying a zone including at least two waypoints, based on the waypoint information stored in said waypoint storage means, and for generating data representing a plurality of dots which are arranged to form a matrix showing the specified zone, the specified zone including two waypoints which the movable object is estimated to continuously pass and being specified as dots showing the two waypoints not to be positioned at the outside limit of the matrix; and display controlling means for controlling the position information of the movable object which is obtained by said position obtaining means, the zone specified by said zone specifying means, symbols expressing at least two waypoints and a symbol expressing a present position of the movable object to be displayed on a display screen of said display means.

15. A position display device comprising:

a display unit having a display screen;

a memory;

an input device which includes user-operable portions and inputs waypoint information representing positions of the plurality of waypoints and an order in which the movable object sequentially passes the plurality of waypoints;

a GPS device, including a receiver which receives signals from GPS satellites and obtains position information representing a position of the movable object based on the received signals;

a controller, which is connected to said display unit, said memory, said input device, and said GPS device, which stores the waypoint information input by the input device into said memory, specifies a zone including at least two waypoints which the movable object is estimated to continuously pass, generates zone information representing the specified zone, based on the waypoint information stored in said memory, and controls said display unit to display a waypoint symbol expressing at least two waypoints included in a zone including the present position of the movable object and a present position symbol expressing the present position of the movable object, based on the zone information and information representing the present position of the movable object which said GPS device obtains, and generates data representing a plurality of dots which are arranged so as to form a matrix showing the specified zone, the specified zone including two waypoints which the movable object is estimated to continuously pass and being specified as dots showing the two waypoints not to be positioned at the outside limit of the matrix.

16. The position display device according to claim 15, wherein said controller specifies the zone which the zone including two waypoints which the movable object is estimated to continuously pass, and including the two waypoints in positions for maintaining a predetermined distance away from edges of the zone.

17. The position display device according to claim 15, wherein said controller controls said display unit to reduce the symbols to be displayed to a scale in which a distance between the present position and waypoint symbols substantially becomes a maximum on the display screen.

18. The position display device according to claim 15, wherein said controller controls a previous position symbol expressing a previous position of the movable object to be displayed on the display screen, based on position information which is obtained by said GPS device.

19. The position display device according to claim 15, wherein said controller controls said display unit to display information, which represents a reduced scale of a zone including positions expressed by the waypoint and present position symbols.

20. The position display device according to claim 15, wherein said controller specifies a zone including all waypoints.

21. The position display device according to claim 15, wherein said GPS device comprises:

a receiver, and a processor which specifies a position of the movable object based on a plurality of waves which said receiver receivers from GPS satellites, and generates position information representing the specified position.

22. A position display device comprising:

display means for displaying a positional relationship between a movable object which moves and a plurality of waypoints which the movable object is estimated to pass;

waypoint storage means for storing waypoint information representing positions of the plurality of waypoints and an order in which the movable object sequentially passes the plurality of waypoints;

movable-object-position obtaining means for obtaining position information representing a present position of the movable object;

zone specifying means for specifying a zone including at least two waypoints in which the movable object is estimated to continuously pass, and for generating zone information representing the specified zone, based on the waypoint information stored in said waypoint storage means; and display controlling means for controlling a waypoint symbol expressing at least two waypoints included in a zone including the present position of the movable object and a present position symbol expressing at least a present position of the movable object to be displayed on a display screen of said display means, based on the zone information in which said zone specifying means generates and information representing the present position of the movable object which said movable-object-position obtaining means obtains, wherein said display controlling means comprises:

means for determining whether there are a plurality of zones in the display screen, each including the present position of the movable object, and when a determination is made that there are a plurality of zones, specifying, of waypoints included in the zones including the present position of the movable object, a waypoint which the movable object is estimated to pass at last, and selecting a zone including the specified waypoint among the zones, and means for controlling a waypoint symbol expressing each waypoint included in the selected zone and a present position symbol expressing the present position of the movable object displayed on the display screen.

23. A position display device comprising:

a display unit having a display screen;

a memory;

an input device which includes user-operable portions and which inputs waypoint information representing positions of the plurality of waypoints and an order in which the movable object sequentially passes the plurality of waypoints;

a GPS device, including a receiver which receives signals from GPS satellites and obtains position information representing a position of the movable object based on the received signals;

a controller, which is connected to said display unit, said memory, said input device, and said GPS device, stores the waypoint information input by the input device into said memory, specifies a zone including at least two waypoints which the movable object is estimated to continuously pass, generates zone information representing the specified zone, based on the waypoint information stored in said memory, and controls said display unit to display a waypoint symbol expressing at least two waypoints included in a zone including the present position of the movable object and a present position symbol expressing the present position of the movable object, based on the zone information and information representing the present position of the movable object which said GPS device obtains, and determines whether there are a plurality of zones, in the display screen, each including the present position of the movable object, and when a determination is made that there are a plurality of zones, specifies, of waypoints included in the zones including the present position of the movable object, a waypoint which the movable object is estimated to pass at last, and selects a zone including the specified waypoint among the zones, and controls a waypoint symbol expressing each waypoint included in the selected zone and a present position symbol expressing the present position of the movable object.

* * * * *